INVENTOR.
ALFRED B. FREEMAN

INVENTOR.
ALFRED B. FREEMAN

3,429,978
ENSEMBLE EFFECTS SYSTEMS
Alfred B. Freeman, Kitchener, Ontario, Canada
(20418 Seaboard Road, Malibu, Calif. 90265)
Filed Dec. 6, 1965, Ser. No. 511,805
U.S. Cl. 84—1.24
Int. Cl. G10h 1/02
10 Claims This invention relates to systems for obtaining enhanced chorus effects from ensembles of voices of different footage or of voices derived from different frequency divider chains in electronic musical instruments and the like.

My copending U.S. patent application No. 397,517 filed September 18, 1964, now U.S. Patent No. 3,347,973 for "Chorus Effects Systems for Electronic Musical Instruments" discusses the musical advantages of having two or more tone generators of slightly different frequency for each note and of having tone generators producing nonlocked octave relations. It was also pointed out that the rate of tonal fluctuations in chorus effects varied with the frequency separation between the different sources and that it was desirable to be able to vary this rate to produce different musical effects.

The aforementioned application disclosed several systems for attaining these results economically. Controlled chorus effects are obtained by using two sets of tone generators and shifting the tuning of one set to change the frequency separation between sets. A set of 19 master oscillators and chains of divide by three stages is shown to have advantages when used in combinations with octave dividing sets and to independently have the advantage of producing notes in nonlocked octave relations and so providing mild chorus effects between voices of different footage. Also disclosed were systems obtaining fixed rate chorus effects between different frequency divider sets driven from the same set of master oscillators and having at least some nonoctave frequency dividers in one set.

The present invention provides a system for detuning the master oscillators of the aforementioned set of 19 in patterns which will increase the rate of chorus effects produced between voices of different footage. Controlled chorus effects are thus achieved economically and effectively from a single tone generating set. This invention further provides means for switching the dividers into a locked octave tone generating configuration by the player when locked octave effects are desired.

The present invention further applies systems for detuning the master oscillators to increase the frequency separation between outputs of different frequency divider sets driven by the masters. At least one of the different frequency divider sets will have at least twelve nonoctave dividers making the frequency separation possible in a conventional instrument. The different divider sets may each produce a full set of outputs so that chorus effects may be obtained between voices in unison as well as between those of different footage from the two sets. Or each set may provide outputs for different alternate octaves only in the interest of economy and then chorus effects will only be available between voices of different footage. Switching means are included to allow the player to convert the system to a locked octave configuration.

In addition to controlling the frequency separations between voices of different footage or voices derived from different divider sets, the patterns of detuning provided by the present invention affect the chorus effects between the different notes of chords. The present invention still further applies these patterns to tone generating sets consisting of individual oscillators to produce enhanced effects and permit larger detuning excursions between octaves than have heretofore been effective for such tone generating sets.

It has been discovered that the detuning can be pushed well beyond the point at which perception of a proper musical scale would be affected as long as the frequency separated signals for notes are used in combination. The ear apparently applies some pitch averaging function between the frequency separated signals and continues to sense a proper scale relation. As chorus effects are only obtained from combinations of frequency separated signals for notes, there is no point in detuning unless such combinations are being used. The invention provides an interlocking control system to prevent detuning from being affected unless combinations are in use and so to avoid the possibility of obtaining mistuned effects inadvertently.

It has also been discovered that the interaction of the chorus effects produced with other types of tonal animation systems, such as those employing moving loudspeakers or sound deflectors, will be pleasing when the chorus effect tonal fluctuations are sufficiently rapid. A useful combination can be obtained when the rates produced by the two systems are substantially the same and when the chorus effect rate is higher than the other. Some other conditions may be found useful as well but it should be recognized that not all combinations will be musically effective. The present invention provides a control interlock to keep the chorus effect rate at least as high as the other animation rate when the system is used in combination with other systems.

An object of the invention is means for producing chorus effects economically and effectively in electronic musical instruments and the like.

A further object of the invention is means for producing controllable rate chorus effects in electronic musical instruments and the like employing tone generating sets having a single set of master oscillators.

A still further object of the invention is means for converting chorus effect producing tone generating sets to locked octave sets at the will of the player.

A yet further object of the invention is a system for detuning the tone generating sets of electronic musical instruments and the like to produce chorus effects between voices of different footage and to enhance the chorus effects between the notes of chords.

A further object still of the invention is a system for using chorus effects effectively in combination with other types of tonal animation.

Other objects and advantages together with a fuller understanding of the invention will be had by referring to the following specification and claims taken in conjunction with the accompanying drawings in which:

Figure 1:
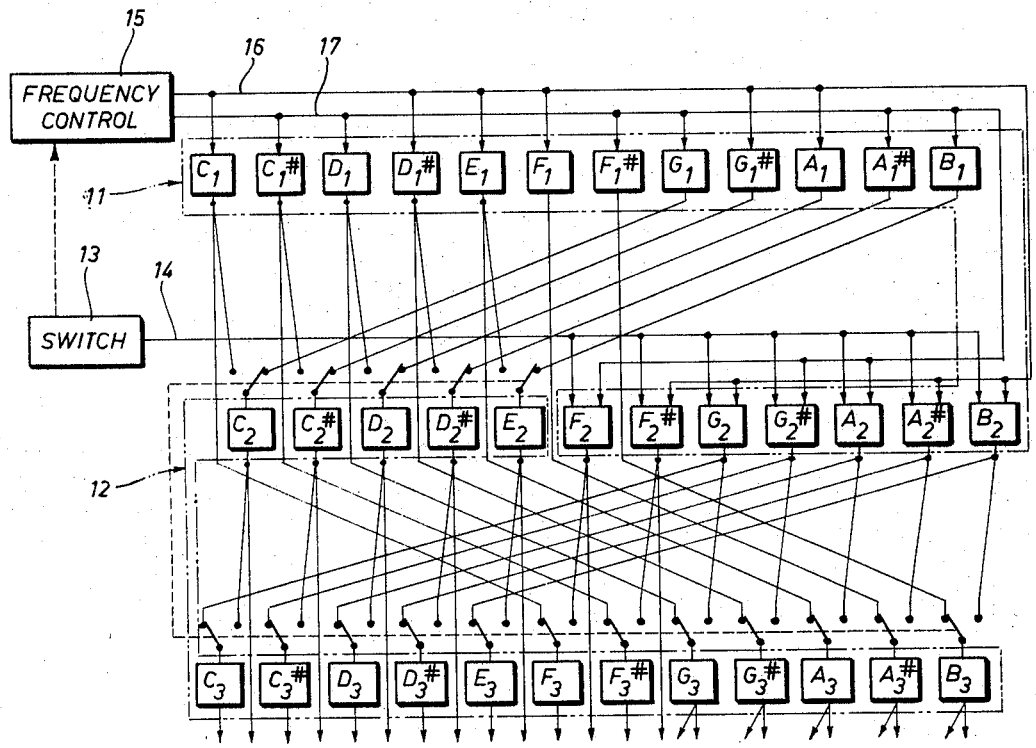
FIG. 1 is a block diagram of a tone generating set together with auxiliary controls forming an embodiment of the invention.

Referring now to FIG. 1, master oscillators 11 form a set of 19 driving frequency dividers 12 through the contacts of switch 13. Oscillators 11 and dividers 12 produce outputs for the notes indicated in their respective blocks. The subscripts to the note designations indicate the number of octave starting with the highest octave as 1. While only a part of the dividers 12 which would normally be used in a tone generating set are shown, it will be recognized that as many as desired could be provided following the same pattern. This pattern consists of 19 chains of dividers 12 driven from the 19 oscillators 11 and of having each divider 12 divide the driving frequency it receives by three.

When switch 13 is placed in its other position, dividers 12 are rearranged into 12 chains by the changed connections and each must divide by two to produce its proper note. Dividers 12 will be of a type which can synchronize to different submultiples of different frequencies so long as the synchronizing submultiples are not too different in frequency. It will be recognized that little change in frequency is necessary to produce the same notes in a divide by two or divide by three tone generating set. Master oscillators 11 will normally be tuned for equal intervals in a divide by three set as explained in the aforementioned U.S. patent application No. 397,517 and the oscillators 11 for the same notes in different octaves will not be at exactly the same frequencies. The switch 13 provides an output on line 14 to the seven oscillators 11 producing outputs for notes in the second octave to shift their tuning to a substantially perfect octave relation with the outputs of oscillators 11 for the corresponding notes in the first octave.

Placing switch 13 in its other position thus converts the tone generating set to a substantially conventional locked octave system. If it were desired, the oscillators 11 for the upper seven notes could be locked to the others by adding more switching to apply synchronizing signals from them to their counterparts in the second octave. Tuning differences between oscillators for a divide by two and a divide by three set are quite small and satisfactory results could be achieved without even providing the tuning correction applied via line 14.

With switch 13 in the position shown, the tone generating set is in the divide by three condition and there are small differences between the notes in different octaves as explained in the aforementioned U.S. patent application No. 397,517. These provide a mild chorus effect between voices of different footage supplied by the tone generating set. Frequency control unit 15 provides opposite polarity outputs on lines 16 and 17 to detune the groups of oscillators 11 to which they connect in opposite directions. This detuning increases the differences from perfect octave intervals and so the rate of chorus effects obtained on ensembles of voices of different footage.

Figure 2:
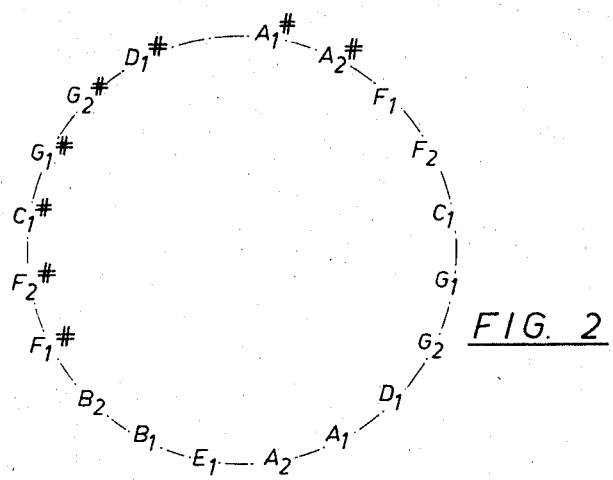
FIG. 2 is a chart showing the order of master oscillators of the apparatus of FIG. 1 controlling notes in successive octaves.

To understand how the detuning produced by unit 15 in the apparatus of FIG. 1 accomplishes its purpose and how other detuning patterns might also be employed effectively, reference should be made to FIG. 2. The chart of FIG. 2 shows the order of oscillators 11 controlling the frequencies of notes in successive octaves. In the case of C notes, for example, the highest C is produced by a master oscillator 11, the next highest C by a divider 12 driven from the oscillator 11 for the highest G, the next highest C by a divider 12 driven from the oscillator 11 for the lower G, etc. To find this order quickly, one has only to start on the chart at the master oscillator 11 for the particular note and read clockwise to find the master oscillators 11 controlling the note in the successively lower octaves.

If alternate oscillators 11 on the chart of FIG. 2 are detuned in opposite directions, the relative frequencies of notes in adjacent octaves will be changed. As there are 19 oscillators instead of an even number, there will be exceptions in the case of several notes on different octave pairs. The exceptions are sufficiently rare and widely distributed as to cause little decrease in musical quality. The change produced by detuning may either be in the same or opposite direction as the detuning provided by the normally tuned divide by three set. This will make for a greater departure from a perfect octave interval for some notes and lesser departures for others. These variations will, however, be a small fraction of the total range of changes useful in producing chorus effects.

It will be recognized that lines 16 and 17 might be connected to oscillators 11 in other patterns which would produce substantially the same effects except that the pattern of execptions to alternate octave displacement would be different. Still other patterns producing different results are also possible and the one of these variations illustrated in FIG. 3 will be discussed next.

Figure 3:
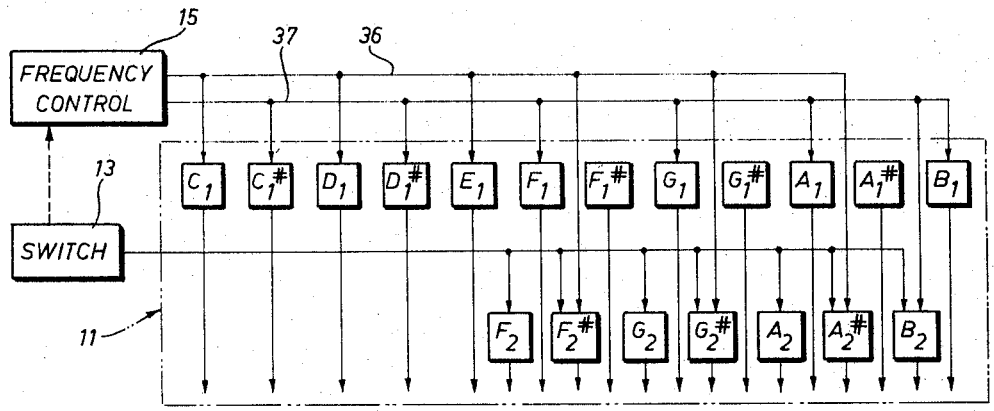
FIG. 3 is a block diagram of part of the apparatus of FIG. 1 showing another pattern of tuning control.

Referring now to FIG. 3, the only changes made to the apparatus of FIG. 1 other than omitting to show dividers 12 is the pattern of connections made between frequency control unit 15 and oscillators 11 by lines 36 and 37. As before, frequency control unit 15 produces opposite polarity outputs on lines 36 and 37 to detune the oscillators 11 connected to each in opposite directions to increase the chorus effect rate. It will be noted that some oscillators 11 are connected to neither of lines 36 and 37 and so will not be detuned. The detuning of those connected to lines 36 and 37 may be greater than in the apparatus of FIG. 1.

The pattern of connections of lines 36 and 37 can probably best be understood by referring back to FIG. 2. Three groups of oscillators 11 can be formed by taking every third one along the chart of FIG. 2. One oscillator 11 will be left out. If one of the groups is left disconnected and the other two connected to lines 36 and 37 respectively, the pattern of FIG. 3 can now be obtained. It can now be realized that detuning the groups connected to lines 36 and 37 in opposite directions and leaving the other group stationary will increase the departures from perfect octave intervals of notes two octaves apart as well as those one octave apart. This increases the chorus effects obtained when using voices of three different footages or of two footages spaced two octaves apart. This detuning pattern also increases the departures of fifths intervals in chords from perfect fifths when large detuning increments are applied. As was the case for FIG. 1, the pattern of FIG. 3 has many possible variations producing substantially the same result.

Figure 4:
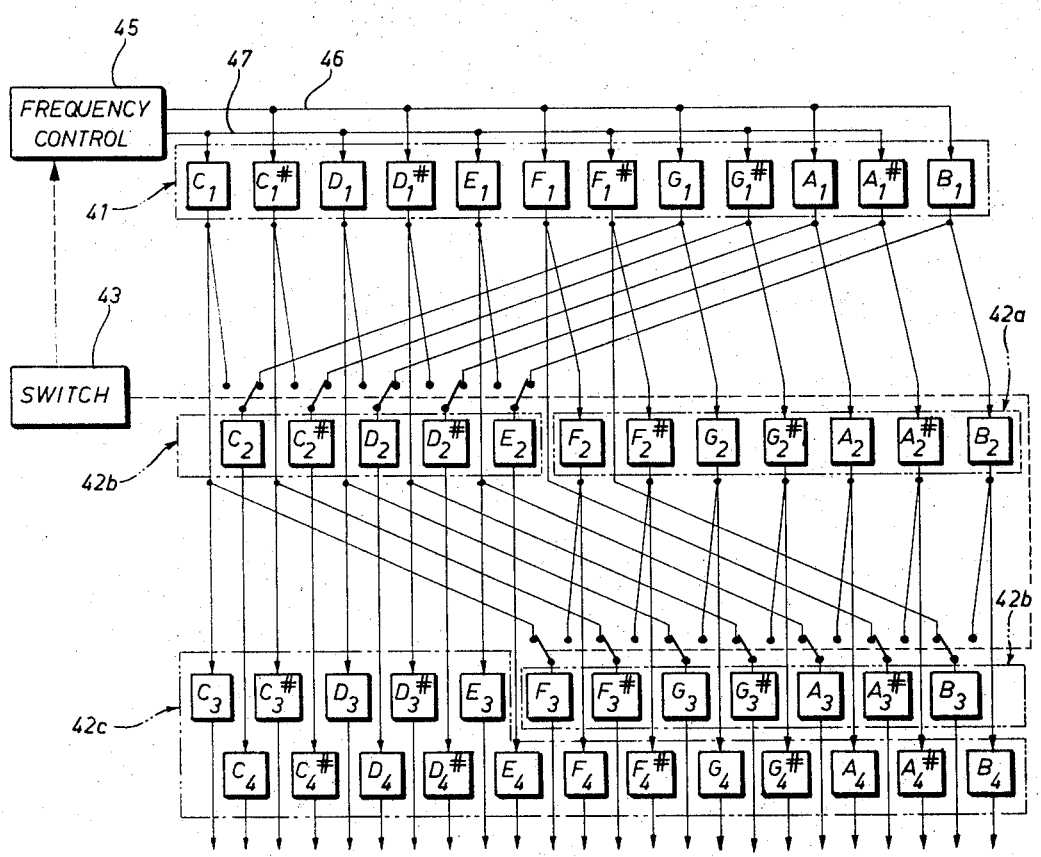
FIG. 4 is a block diagram of another tone generating set together with auxiliary controls forming another embodiment of the invention.

Referring now to FIG. 4, oscillators 41 may be the same as oscillators 1 of FIG. 1 except that there are only 12 of them. Dividers 42 may be of the same type as dividers 12 of FIG. 1 but are arranged differently. The seven dividers 42a for the seven highest notes in the second octave are connected directly to oscillators 11 for the corresponding notes in the first octave and so divided by two in the conventional manner. The 12 dividers 42a for the next 12 notes receive their driving inputs through the contacts of switch 43. These dividers 42b divide by three when switch 43 is in the positions shown and by two when it is in its other position.

The remaining dividers 42c may either divide by two or four depending upon whether unison chorus effects or economy is desired. The number in the lower right hand corner of the blocks represents to octave number if dividing by four. The numbers on the lower right hand corner would be one less if the stages were dividing by two. Some of these remaining dividers 42c are driven by the dividers 42b associated with switch 43 and the others are driven either directly by oscillators 41 or by dividers 42a dividing octavely from them. In the divide by two condition, these remaining dividers 42c produce duplicate outputs of the notes produced by dividers 42b and of all notes below. In the divide by four condition, dividers 42c simply produce outputs for the remaining notes required.

Frequency control unit 45 produces opposite polarity outputs on lines 46 and 47 to detune the groups of oscillators 41 connected to each in opposite directions. The groupings of oscillators 41 is such that each oscillator 41 and the divider 42b producing the same note are shifted in frequency in opposite directions. This produces a chorus effect between voices of different footage when dividers 42c are dividing by four and between some combinations of voices of the same footage when dividers 42c are dividing by two. In addition to increasing the frequency separation between signals locked in frequency to oscillators 41 and dividers 42b, the detuning pattern also increases the departure of fifths intervals in chords from perfect fifths.

Figure 5:
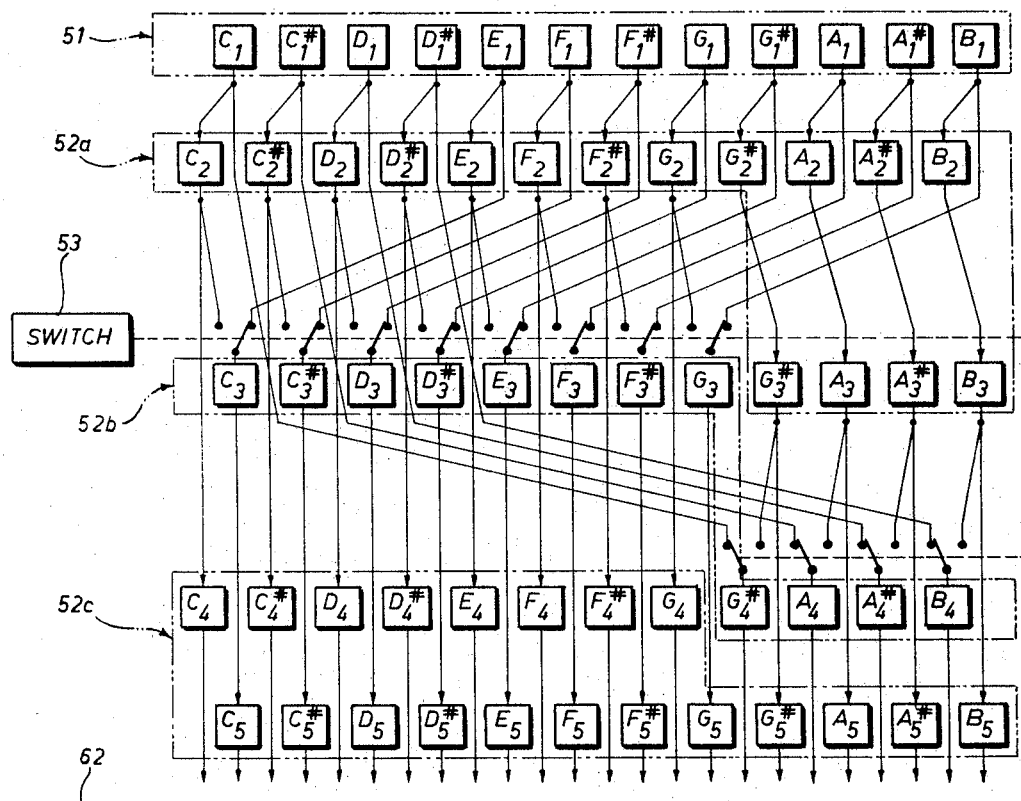
FIG. 5 is a block diagram of yet another tone generating set together with switching controls forming an embodiment of the invention.

Referring now to FIG. 5, oscillators 51, dividers 52a, 52b and 52c, and switch 53 are similar to oscillators 41, dividers 42a, 42b, and 42c, and switch 43 of FIG. 4. The major difference is that dividers 52b divide by five rather than three and are therefore connected in a different arrangement through switch 53. A further difference between the apparatus of FIG. 4 and FIG. 5 is that the latter does not include a frequency control unit and its oscillators 51 remain fixed in tuning. When switch 53 is in its other position, dividers 52b divide by two and the result is the same as in FIG. 4 except that fewer notes would be duplicated by dividers 52c when dividing by two.

When switch 53 is in the position shown and dividers 52b are dividing by five as previously mentioned, the frequency separation between the oscillator 51 and the divider 42b producing the same note is equal to the difference between a perfect third and a tempered third interval. This difference is approximately 0.8% and so will result in a celeste rate chorus effect between ensembles of voices of which some are octavely related to oscillators 51 and some are octavely related to dividers 52b. Further detuning is thus unnessary and a detuning unit is not provided. Operation of switch 53 restores the system to a locked octave condition.

Figure 6:
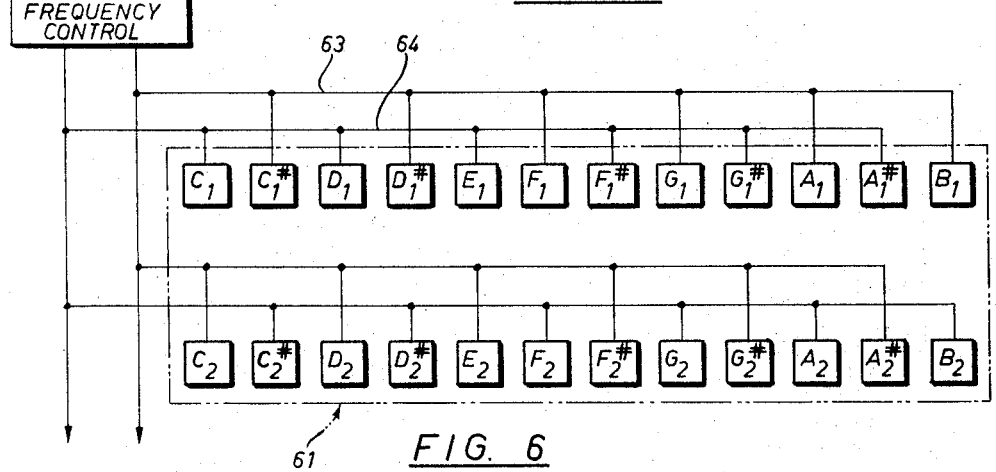
FIG. 6 is a block diagram of still another tone generating set together with auxiliary controls forming still another embodiment of the invention.

Referring now to FIG. 6, oscillators 61 provide an individual source for each note in contrast to the oscillator and divider combination of the previously described systems. Frequency control unit 62 produces opposite polarity outputs on lines 63 and 64 to detune the groups of oscillators 61 connected to each in opposite directions. The pattern of connections of oscillators 61 in the first octave is the same as ocillators 41 in the apparatus of FIG. 4. The pattern in the second octave is the same except that lines 63 and 64 are interchanged. This pattern of detuning increases the departure of all fifth and octave intervals from perfect intervals after cross overs of perfect intervals are first made for some fifths intervals. The chorus effects at high rates on chords are more effective when the fifth interval beating rate is also increased.

Figure 7:
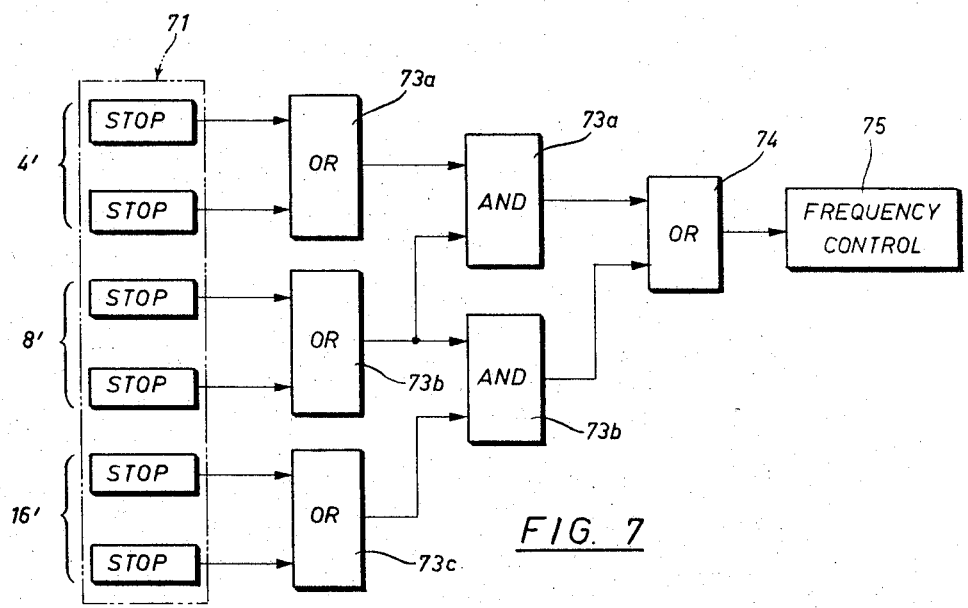
FIG. 7 is a block diagram of a control interlock system which can be added to the aforegoing embodiments to prevent mistuning effects from being obtained inadvertently.

Referring now to FIG. 7, stops 71 are the controls which select the voicing used in an electronic instrument and are conventional except that they provide inputs to Or gates 72a, 72b, and 72c. Or gates 72a, 72b, and 72c produce outputs when any of the stops 71 associated with they respectively are operated. And gates 73a and 73b produce outputs when they receive outputs from Or gates 72a and 72b and from Or gates 72b and 72c respectively. Or gate 74 in turn produces an enabling output to frequency control 75 whenever either And gates 73a or 73b produce an output. The net result is that frequency control 75 receives an enabling input whenever a combination of stops 71 selecting voices of two different footage is operated. Such control can be applied to any of the frequency control units of the preceding embodiments.

Figure 8:
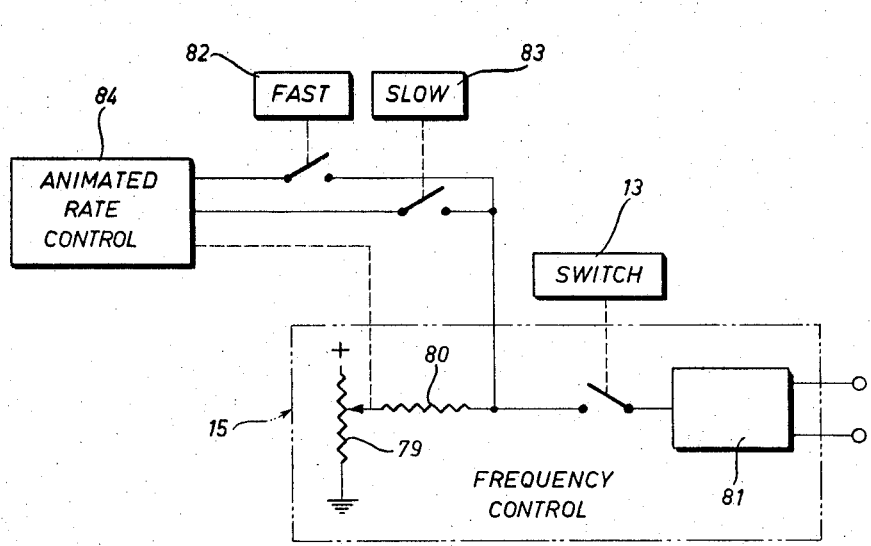
FIG. 8 is a block diagram of a control interlock system which can be added to the aforegoing embodiments similarly to the apparatus of FIG. 7 to prevent possibly undesirable interactions with other types of tonal animation systems from being obtained inadvertently.

Referring now to FIG. 8, switch 13 and frequency control unit 15 are, for example, the same units as may be used in the apparatus of FIG. 1. Potentiometer 79 produces an adjustable voltage output through resistor 80 and the contacts of switch 13 to inverter 81 which in turn produces opposite polarity outputs on lines 16 and 17. Potentiometer 79, resistor 80, and inverter 81 are all part of frequency control unit 15 as shown and similar arrangements might be used for any of the other frequency control units. Fast and Slow controls 82 and 83 include the switch contacts shown to apply voltages of different magnitude from animated rate control unit 84 to the junction of resistor 80 and switch 13. These voltages insure that as high or higher beat rate will be produced between voices of different footage as is produced by the animation device. Mechanical linkage from animated rate control unit 84 to the arm of potentiometer 79 alternatively insures that the rate of beating between voices of different footage will be as high or higher than the animation rate when proportional control is used on the latter.

It will be recognized that various changes and modifications could be made to the various embodiments shown herein without departing from the spirit or scope of the invention as defined in the appended claims. While shown in electrical form, the logic elements of FIG. 7 might also consist of mechanical units or linkages. Interlocking action between a frequency control unit and another animation control unit could be made in a number of other ways than the one shown in FIG. 8. The individual oscillators of FIG. 6 could be arranged in three groups rather than two following the teaching of FIG. 3. Instead of forming the groups by reference to FIG. 2, one would simply refer to the well known Circle of Fifths of musical theory and take every third one for each group. This would allow three octave arrangements to be used and would provide chorus effects between voices of footages spaced apart as well as between those of adjacent footage.

What is claimed is:

1. In a tone generator for an electronic musical instrument, a plurality of oscillators tuned in accordance with a musical scale, and means for detuning said oscillators under control of the player in accordance with patterns which change the magnitude of musical fifths intervals within the scale.

2. The combination according to claim 1 wherein the magnitude of octave intervals are also changed by said patterns of detuning.

3. The combination according to claim 1 including a plurality of frequency dividers each locked to the frequency of one of said oscillators in a nonoctave ratio.

4. The combination according to claim 3 including means for switching the inputs to said frequency dividers so that they lock in frequency to different ones of said oscillators in octave relation.

5. The combination according to claim 1 including a plurality of chains of frequency dividers driven by said oscillators and having stages operating at dividing ratios greater than two.

6. The combination according to claim 1 including a purality of chains of frequency dividers driven in pairs by said oscillators wherein one chain of each pair includes a stage dividing by a nonoctave ratio.

7. The combination according to claim 6 including means for switching the input frequencies to said nonoctave dividing stages so that their inputs and outputs are in octave relationship.

8. The combination according to claim 6 wherein some of the stages of said chains divide by four.

9. The combination according to claim 1 including means for interlocking operation of said detuning means with other controls of said musical instrument.

10. In a tone generator for an electronic musical instrument, a pluraity of oscillators, a plurality of chains of oscillators driven in pairs by said oscillators wherein one chain of each pair includes a stage dividing by a nonoctave ratio, and means for switching the input frequencies to said nonoctave dividing stages so that their inputs and outputs are in octave relationship.

References Cited

UNITED STATES PATENTS 2,500,820  3/1950  Hanert _____ 84—1.24 X
3,253,078  5/1966  Wolfanger _____ 84—1.24

ARTHUR GAUSS, *Primary Examiner.*

DONALD D. FORRER, *Assistant Examiner.*

U.S. Cl. X.R.

84—1.1